US012508040B2

(12) United States Patent
Cummings et al.

(10) Patent No.: US 12,508,040 B2
(45) Date of Patent: Dec. 30, 2025

(54) MEDICAL SYSTEMS, DEVICES, AND RELATED METHODS

(71) Applicant: Boston Scientific Scimed, Inc., Maple Grove, MN (US)

(72) Inventors: Nathan T. Cummings, Worcester, MA (US); Judith B. Frontin, Somerville, MA (US); Jared Robertson, Boston, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 423 days.

(21) Appl. No.: 17/747,750

(22) Filed: May 18, 2022

(65) Prior Publication Data
US 2022/0370089 A1    Nov. 24, 2022

Related U.S. Application Data

(60) Provisional application No. 63/190,030, filed on May 18, 2021.

(51) Int. Cl.
*A61B 17/22* (2006.01)
(52) U.S. Cl.
CPC .......... *A61B 17/22031* (2013.01); *A61B 2017/22035* (2013.01)
(58) Field of Classification Search
CPC ..... A61B 17/0218–0293; A61B 17/22–22032; A61B 17/221–2255;
(Continued)

(56) References Cited

U.S. PATENT DOCUMENTS 7,988,619 B2 * 8/2011 Longo ............... A61B 1/32
606/198
10,117,661 B2 * 11/2018 Lippitt ............... A61B 17/221
(Continued)

FOREIGN PATENT DOCUMENTS

JP    H05200122 A    8/1993
JP    2008517701 A    5/2008
(Continued)

OTHER PUBLICATIONS

International Search Report and Written Opinion issued in International Application No. PCT/US2022/029591, issued Jul. 22, 2022 (12 pages).

*Primary Examiner* — Elizabeth Houston
*Assistant Examiner* — Jonathan A Hollm
(74) *Attorney, Agent, or Firm* — Bookoff McAndrews PLLC (57) ABSTRACT

A medical device may include a first body having a lumen and a central longitudinal axis; a second body positioned at least partially within the lumen of the first body; and an arm assembly. The arm assembly may include a first arm coupled to the first body and extending distal to the first body; and a second arm coupled to the second body and extending distal to the second body. A distal end portion of the first arm may be coupled to a distal end portion of the second arm. Distal movement of the second body may be configured to move the first arm and the second arm radially-outward away from the central longitudinal axis. Proximal movement of the second body, relative to the first body, may be configured to move the first arm and the second arm radially-inward towards the central longitudinal axis.

15 Claims, 8 Drawing Sheets

(58) Field of Classification Search
CPC .................. A61B 2017/0225–0287; A61B 2017/2212–2253; A61B 2017/22001–22035; A61M 29/00
See application file for complete search history.

(56) References Cited

U.S. PATENT DOCUMENTS

| | | | |
|---|---|---|---|
| 2004/0073243 A1* | 4/2004 | Sepetka | A61F 2/013 606/159 |
| 2009/0082802 A1* | 3/2009 | Benjamin | A61B 17/0057 606/213 |
| 2015/0148813 A1 | 5/2015 | Campbell et al. | |
| 2015/0265268 A1 | 9/2015 | Diao et al. | |
| 2016/0038133 A1 | 2/2016 | Smith et al. | |
| 2018/0361118 A1 | 12/2018 | Cully et al. | |

FOREIGN PATENT DOCUMENTS

| | | |
|---|---|---|
| JP | 2009291414 A | 12/2009 |
| WO | WO 2015/077599 | 5/2015 |
| WO | WO 2019/040943 | 2/2019 |

\* cited by examiner

MEDICAL SYSTEMS, DEVICES, AND RELATED METHODS

CROSS REFERENCE TO RELATED APPLICATION

This application claims priority to U.S. Provisional Application No. 63/190,030 filed May 18, 2021, the entirety of which is incorporated by reference herein.

TECHNICAL FIELD

Various aspects of this disclosure relate generally to manipulation of bodily material, including grasping, removing, moving, and otherwise manipulating bodily or foreign material from a patient. More specifically, at least certain embodiments of this disclosure relate to systems, devices, and related methods for removing material from a patient's body, among other aspects.

BACKGROUND

A food bolus is formed as part of the digestion process when food is lubricated with saliva and formed into a cohesive mass. Usually, the bolus is swallowed, passing from the mouth, through the esophagus, and into the stomach for gastric digestion. Sometimes, however, the bolus becomes lodged in the esophagus and does not pass to the stomach. In this instance, an esophageal food bolus obstruction is caused by the obstruction of the esophagus. While some esophageal food boli can pass by themselves or with the assistance of medications, some require the use of endoscopy to move the obstructing food into the stomach, or remove it from the esophagus. A variety of devices are currently used to aid in the removal of esophageal foreign objects. There are needs to develop new bolus removal devices, systems, and methods to overcome the shortcomings in prior art.

SUMMARY

Aspects of the disclosure relate to, among other things, systems, devices, and methods for moving and/or removing material from a patient's body, among other aspects. Each of the aspects disclosed herein may include one or more of the features described in connection with any of the other disclosed aspects.

According to one aspect, a medical device may include a first body having a lumen and a central longitudinal axis; a second body positioned at least partially within the lumen of the first body; and an arm assembly. The arm assembly may include a first arm coupled to the first body and extending distal to the first body; and a second arm coupled to the second body and extending distal to the second body. A distal end portion of the first arm may be coupled to a distal end portion of the second arm. Distal movement of the second body, relative to the first body, may be configured to move the distal end portion of the first arm and the distal end portion of the second arm radially-outward away from the central longitudinal axis. Proximal movement of the second body, relative to the first body, may be configured to move the distal end portion of the first arm and the distal end portion of the second arm radially-inward towards the central longitudinal axis.

In other aspects, a medical device may include one or more of the following features. A first control wire may extend proximally from the first body and a second control wire may extend proximally from the second body. The arm assembly may be a first arm assembly, and the medical device may further include a second arm assembly including: a third arm coupled to a distal portion of the first body and extending distal to the first body; and a fourth arm coupled to a distal portion of the second body and extending distal to the second body, wherein a distal end portion of the third arm is coupled to a distal end portion of the fourth arm. The medical device may further include a third arm assembly including: a fifth arm coupled to a distal portion of the first body and extending distal to the first body; and a sixth arm coupled to a distal portion of the second body and extending distal to the second body, wherein a distal end portion of the fifth arm is coupled to a distal end portion of the sixth arm. Distal movement of the second body, relative to the first body, may be configured to move the distal end portion of the third arm, the distal end portion of the fourth arm, the distal end portion of the fifth arm, and the distal end portion of the sixth arm radially-outward away from the central longitudinal axis. Proximal movement of the second body, relative to the first body, may be configured to move the distal end portion of the third arm, the distal end portion of the fourth arm, the distal end portion of the fifth arm, and the distal end portion of the sixth arm radially-inward towards the central longitudinal axis. The first arm assembly, the second arm assembly, and the third arm assembly may be evenly spaced from each about the central longitudinal axis.

In other aspects, a medical device may include one or more of the following features. The first body may be cylindrical and include a first lumen; and wherein the second body may be cylindrical, include a second lumen, and may be positioned within first lumen. The first arm and the second arm may be rectangular and may have a rectangular cross-section taken perpendicular to the central longitudinal axis. The first arm and the second arm may be configured to be in a straight configuration when a distalmost end of the first body is aligned with a distalmost end of the second body. The medical device may further include a cylindrical sleeve coupled to the distal portion of the first body, and the first arm and the second arm may extend through the cylindrical sleeve and out a distal end of the cylindrical sleeve. The cylindrical sleeve may include a first lumen and a second lumen each extending longitudinally through the cylindrical sleeve, and the first arm may be positioned within the first lumen and the second arm may be positioned within the second lumen. The first arm and the second arm may be biased towards the central longitudinal axis. The second arm may include a protrusion extending radially-inward towards the central longitudinal axis, and the protrusion may define a surface facing a proximal direction when the second arm is parallel to the central longitudinal axis. The first arm may contact the second arm at a position between a proximal end and a distal end of the first arm when the first arm and the second arm are generally parallel to the central longitudinal axis and the medical device is in a neutral configuration; and the first arm may be spaced from the second arm at a position between the proximal end and the distal end of the first arm when the medical device is moved to an open configuration or a closed configuration such that at least one of the first arm or the second arm is angled relative to the central longitudinal axis.

In other aspects, a medical device may include one or more of the following features. The medical device may further include a shaft coupled to a proximal portion of the first body, and the first arm may be coupled to a distalmost end of the first body. The second arm may be coupled to a distalmost end of the second body. The medical device may further comprise a handle assembly including an actuator configured to facilitate distal or proximal movement of the second body relative to the first body. The first arm may be curved towards the central longitudinal axis when the medical device is in a closed configuration; the second arm may be curved away from the central longitudinal axis when the medical device is in an open configuration; a proximal end of the first arm may be distal to a proximal end of the second arm when the medical device is in an open configuration; and the proximal end of the second arm may be distal to the proximal end of the first arm when the medical device is in a closed configuration.

In another aspect, a medical device may include a shaft having a proximal end, a distal end, and a longitudinal axis; a first arm extending distally from the distal end of the shaft and including a first annular member at its distal end; a second arm extending distally from the distal end of the shaft and including a second annular member at its distal end; and a fiber assembly. The fiber assembly may include a first fiber segment extending through the first ring portion and the second ring portion; a net positioned proximal from the first ring portion and the second ring portion, a second fiber segment, wherein a first end of the second fiber segment is coupled to the first fiber segment and a second end of the second fiber segment is coupled to the net; and a third fiber segment coupled to the net and extending proximally from the net through the shaft.

In other aspects, a medical device may include one or more of the following features. A third arm may extend distally from the distal end of the shaft and including a third ring portion at its distal end; and the fiber assembly may further include a fourth fiber segment extending from the first string segment to the net, wherein the first fiber segment extends through the third ring portion, wherein the first fiber segment forms a closed loop. The net may be triangular and may be configured to be moved into a lumen of the shaft.

In another aspect, a medical device may include a shaft having a proximal end, a distal end, and a central longitudinal axis; a first arm extending distally from the distal end of the shaft and including a first ring portion at its distal end; a second arm extending distally from the distal end of the shaft and including a second ring portion at its distal end; and a fiber assembly. The fiber assembly may include a first fiber segment extending through the first ring portion and the second ring portion; a second fiber segment extending longitudinally through a lumen of the shaft. A first end of the first fiber segment may be coupled to a distal end of the second fiber segment and a second end of the first fiber segment may be coupled to the distal end of the second fiber segment. In some examples, the first arm and the second arm may be biased radially-outward from the central longitudinal axis.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary aspects of this disclosure and together with the description, serve to explain the principles of the disclosure.

DETAILED DESCRIPTION

This disclosure is drawn to systems, devices, and methods for manipulating material within a body of a patient, among other aspects. Though examples in this disclosure focus on the gastrointestinal system, and its various lumens, aspects of this disclosure can be applied to any other body lumen, including any lumen of the urinary system, pancreaticobiliary, etc. Reference will now be made in detail to aspects of this disclosure, examples of which are illustrated in the accompanying drawings. Wherever possible, the same or similar reference numbers will be used through the drawings to refer to the same or like parts. The term "distal" refers to a portion farthest away from a user when introducing a device into a patient. By contrast, the term "proximal" refers to a portion closest to the user when placing the device into the patient. The proximal and distal directions are labeled throughout the drawings with an arrow labeled "D" for the distal direction and an arrow labeled "P" for the proximal direction. As used herein, the terms "comprises," "comprising," or any other variation thereof, are intended to cover a non-exclusive inclusion, such that a process, method, article, or apparatus that comprises a list of elements does not necessarily include only those elements, but may include other elements not expressly listed or inherent to such process, method, article, or apparatus. The term "exemplary" is used in the sense of "example," rather than "ideal."

Embodiments of this disclosure may be used to move target material in an endo-luminal space, or facilitate the movement thereof. In particular, some embodiments include a grasping device for both dilation of a body lumen and grasping of material.

Figure 1A:
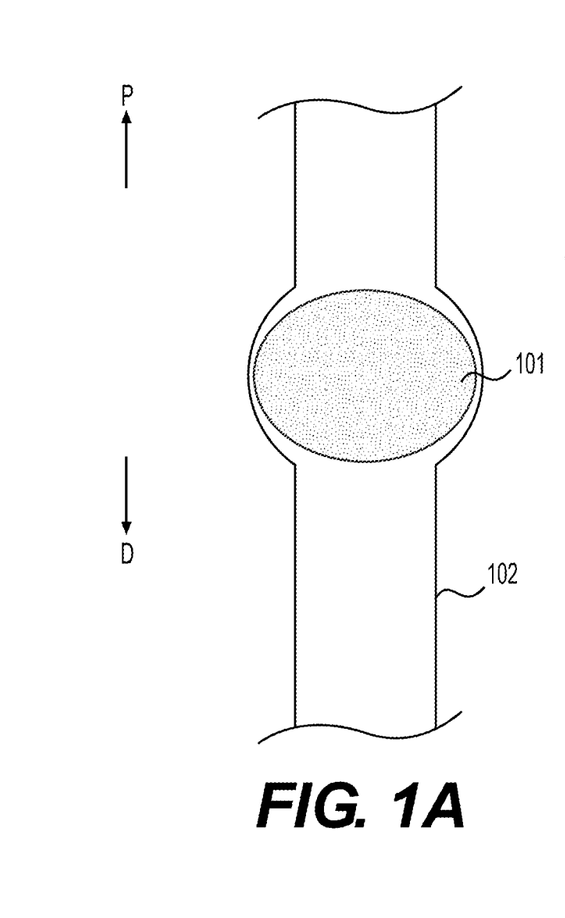
FIGS. 1A-1C are perspective views of a distal end of an exemplary medical device within a body lumen, according to aspects of this disclosure.
Figure 1B:
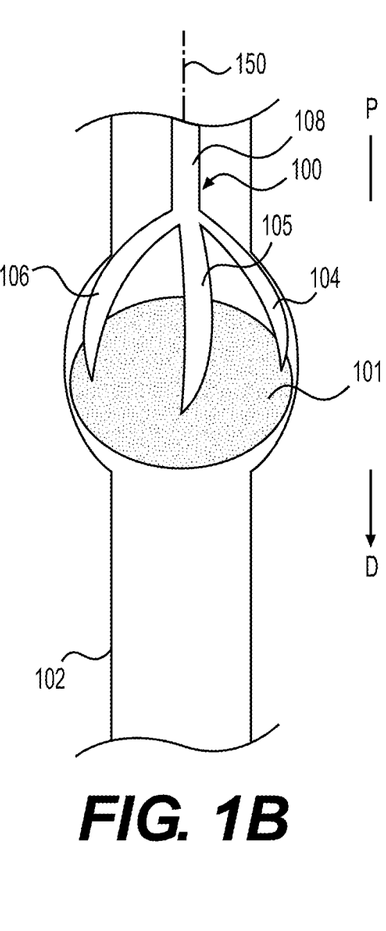

FIG. 1A illustrates material 101, such as a bolus, positioned within a body lumen 102, such as an esophagus. FIG. 1B shows a medical device 100 positioned within body lumen 102. Medical device 100 may be a grasping device and may include a shaft 108 extending longitudinally to arms 104-106 at a distal portion of device 100. Shaft 108 may be flexible and may be configured to move through a patient's body, such as within body lumen 102. Arms 104-106 may curve radially-inward towards a central longitudinal axis 150 of device 100, and arms 104-106 may be configured to be atraumatic. One or more actuators may be positioned at a proximal end (not shown) of device 100, and the one or more actuators may control the movement of arms 104-106. In some examples, the one or more actuators may be positioned on a handle assembly of device 100 and may control movement of arms 104-106. In some instances, movement of arms 104-106 may be controlled by a device electronically connected to device 100. Each of arms 104-106 may move radially outward from axis 150 into an open configuration shown in FIG. 1B. In some examples, movement of arms 104-106 radially-outward may expand the diameter of a portion of body lumen 102 without damaging body lumen 102. For example, since each of arms 104-106 is curved radially-inward towards axis 150, movement of arms 104-106 radially outward from axis 150 may not pierce a wall of body lumen 102.

After a user has moved arms 104-106 into an open configuration, a user may move shaft 108 distally and position material 101 between arms 104-106. Since each of arms 104-106 are curved radially-inward towards axis 150, a radially-outer surface, relative to axis 150, of each of arms 104-106 may slide along a wall of body lumen 102 when device 100 is moved distally. Once material 101 is positioned between arms 104-106, the user may actuate one or more actuators to move each of arms 104-106 radially inward towards axis 150 to grasp material 101.

Figure 1C:
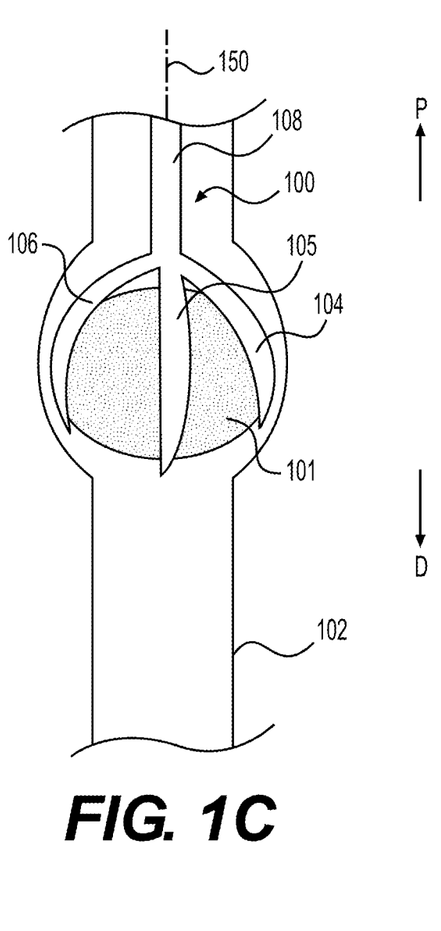

FIG. 1C shows arms 104-106 positioned radially-inward towards axis 150 relative to the position of arms 104-106 in FIG. 1B such that arms 104-106 may grasp material 101. The user may then move shaft 108 proximally to move arms 104-106 and material 101 grasped by arms 104-106 out of body lumen 102. In other examples, the user may push shaft 108 distally to move arms 104-106 and material 101 distally through body lumen 102 and into, for example, the patient's stomach. In some examples, the user may move arms 104-106 radially outward from axis 150 to expand body lumen 102. For example, arms 104-106 may contact an inner wall of body lumen 102 and cause the inner wall of body lumen 102 to move radially outward from axis 150. This may facilitate movement of material 101 through body lumen 102 and into another area of the patient's body, such as the stomach. Any of the medical devices described herein may be used in the manner described hereinabove.

Figure 2A:
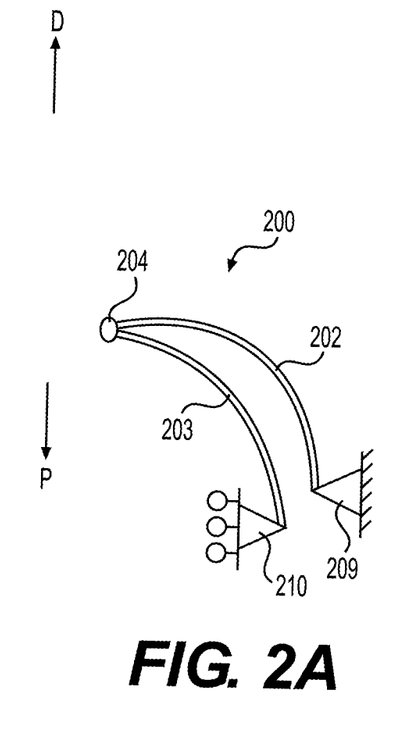
FIGS. 2A-2C are side views of an arm assembly for use in an exemplary medical device, according to aspects of this disclosure.
Figure 2B:
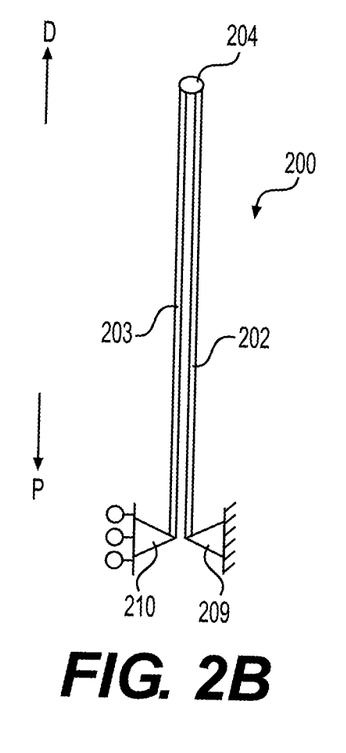
Figure 2C:
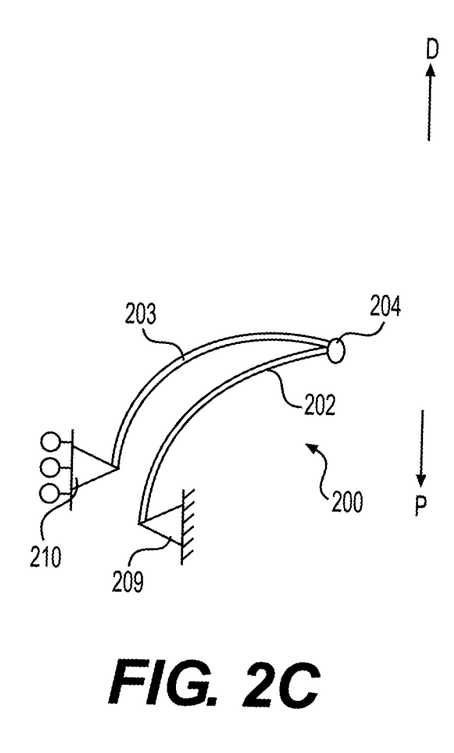

FIGS. 2A-2C show an arm assembly 200 that may be incorporated into any of the medical devices described herein, for example as arm assemblies 305-307 described with reference to FIG. 3. Arm assembly 200 may include a first rod 202 extending from a first anchor 209 to a distal end 204, and a second rod 203 extending from a second anchor 210 to distal end 204. First rod 202 and second rod 203 may be flexible and may be biased towards a straight configuration (shown in FIG. 2B). First rod 202 may be fixedly coupled to second rod 203 at distal end 204. In some examples, first rod 202 may be welded to second rod 203, or coupled together via any other similar means known in the art. When a user moves second rod 203 relative to first rod 202, arm assembly 200 may bend. For example, when a user pulls anchor 210 proximally to move second arm 203 proximally, both first arm 202 and second arm 203 may bend and first arm 202 may bend towards second arm 203 as shown in FIG. 2A. For example, first anchor 209 may be located on a surface of a first device and second anchor 210 may be located on a surface of a second device, different from the first device, such that first anchor 209 and second anchor 210 may move relative to each other. When a user pushes anchor 210 distally to move second arm 203 distally, both first arm 202 and second arm 203 may bend, and first arm 202 may bend away from second arm 203 as shown in FIG. 2C. FIG. 2B shows both first arm 202 and second arm 203 in a neutral position with first arm 202 substantially parallel to second arm 203, and both first arm 202 and second arm 203 in a substantially straight configuration. Starting from the position shown in FIG. 2A, if a user moves anchor 210 distally while anchor 209 does not move, then arm assembly 200 may transition from the position shown in FIG. 2A to a neutral position shown in FIG. 2B then to the position shown in FIG. 2C. It will be understood that first arm 202 and second arm 203 are not limited to rods, and may be any member having sufficient rigidity to receive a force in the proximal-distal direction, and sufficient flexibility to bend as described herein.

Figure 3A:
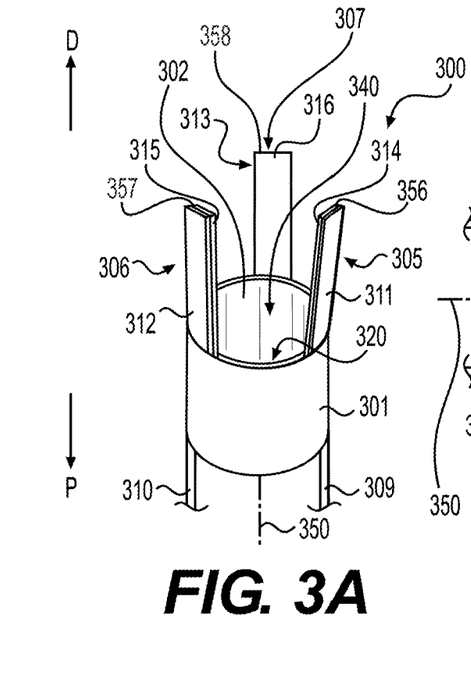
FIG. 3A is a perspective view of a distal portion of an exemplary medical device, according to aspects of this disclosure.
Figure 3B:
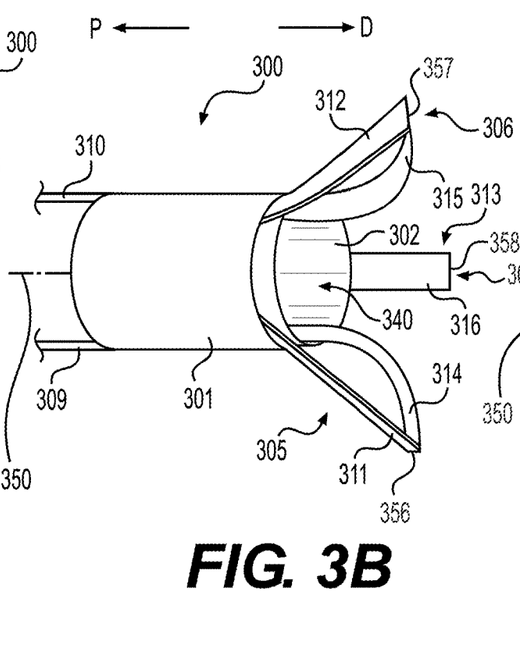
FIGS. 3B and 3C are side views of the distal portion of the medical device of FIG. 3A, according to aspects of this disclosure.
Figure 3C:
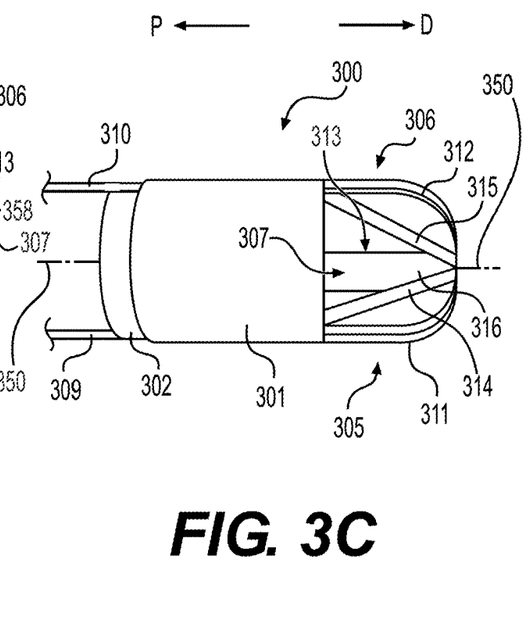

FIGS. 3A-3C illustrate an exemplary medical device 300 including a first body 301 and a second body 302 concentric with the first body 301. First body 301 and second body 302 each may be cylindrical and may include a lumen 340 extending longitudinally through one or both of first body 301 and second body 302. First body 301 and second body 302 may each have a distalmost end 320, and in some examples distalmost end 320 may extend circumferentially around a central longitudinal axis 350. Second body 302 may be configured to move within first body 301 in the proximal-distal direction. First body 301 may have a radially-inward facing surface, relative to axis 350, that contacts a radially-outward facing surface, relative to axis 350, of second body 302. First body 301 may be coupled to a first control wire 309 at a proximal end of first body 301, and second body 302 may be coupled to a second control wire 310 at a proximal end of second body 302. Each of control wires 309, 310 may extend proximally from first body 301 and second body 302 to a proximal portion of device 300. In some examples, each of control wires 309, 310 may be coupled to a handle assembly of device 300 at a proximal end of device 300. Medical device 300 may be configured to move via actuation of one or more actuators at a proximal portion of device 300. Each of control wires 309, 310 may be flexible and may be sufficiently rigid to move first body 301 and second body 302 proximally and distally. In some examples, first body 301 may be fixedly coupled to a distal end of an endoscope or other medical device.

Medical device 300 may further include three arm assemblies 305-307. Although three arm assemblies 305-307 are shown in FIGS. 3A-3C, medical device 300 is not so limited and may include any number of arm assemblies 305-307. Each arm assembly 305-307 may extend distally from a distal end 320 of each of first body 301 and second body 302. Arm assembly 305 may include a first arm 311 coupled to first body 301 at a proximal end of first arm 311, and a second arm 314 coupled to second body 302 at a proximal end of second arm 314. In some examples, first arm 311 and second arm 314 may be rectangular and may have a rectangular cross-section taken perpendicular to a longitudinal axis of the arm. In other examples, first arm 311 and second arm 314 may be cylindrical or any other suitable shape. A distalmost end 356 of first arm 311 may be coupled to a distalmost end 356 of second arm 314. In other examples, first arm 311 and second arm 314 may be integral and may be formed by folding a single piece of material, such as nitinol or other suitable material, and then coupling a first end of the piece of material to the first body 301 and a second end of the piece of material to second body 302. In some examples, each of arm assemblies 305-307 may be the same length and in other examples arm assemblies 305-307 may be different lengths.

In a neutral position shown in FIG. 3A, first arm 311 and second arm 314 may be substantially straight and may be substantially parallel to central longitudinal axis 350 of device 300. In other examples, first arm 311 and second arm 314 may extend along an axis forming an angle other than zero degrees relative to axis 350, e.g., transverse to axis 350, when in a neutral position. A radially-inward facing surface, relative to axis 350, of first arm 311 may contact a radially-outward facing surface, relative to axis 350, of second arm 314 when arm assembly 305 is in a neutral position.

Arm assembly 306 may include a first arm 312 and a second arm 315 connected together at a distalmost end 357, and arm assembly 307 may include a first arm 313 and a second arm 316 connected together at a distalmost end 358. Each of arm assemblies 306, 307 may have any of the features described herein in relation to arm assembly 305. Arm assemblies 305-307 may be evenly spaced around the distalmost end 320 of first body 301 and the distalmost end of second body 302, or may be spaced at other relative positions to each other. At a neutral position shown in FIG. 3A, each of arm assemblies 305-307 may be substantially straight and substantially parallel to axis 350.

As shown in FIG. 3B, when second cylinder 302 is pushed distally relative to first cylinder 301, each arm assembly 305-307 may be moved radially-outward from axis 350 such that a proximal end of each of arms 314-316 may be positioned distal to a proximal end of each of arms 311-313. Arms 314-316 may be curved radially outward from axis 350 and arms 311-313 may be substantially straight. Alternatively, arms 314-316 and arms 311-313 may all curve radially outward from axis 350. FIG. 3B illustrates an open configuration of medical device 300 in which arm assemblies 305-307 are configured to receive material. When first arms 311-313 are moved proximally relative to second arms 314-316, a space may form between each pair of arms 311-316 (e.g. pair of arms 311, 314; pair of arms 312, 315; and pair of arms 313, 316). In this configuration, the distalmost end 356, 357, 358 of each arm assembly 305-307 may move radially outward relative to axis 350. Arm assemblies 305-307 may include metal, polymer, composite, or other suitable material.

FIG. 3C shows medical device 300 in a closed configuration, such that each arm assembly 305-307 is moved radially inward towards axis 350 relative to the neutral position of FIG. 3A. Second body 302 may be moved proximally relative to first body 301 such that a portion of each of arms 314-316 moves proximal to each of arms 311-313. In the closed configuration, each of arms 314-316 may be substantially straight, and each of arms 311-313 may be curved towards axis 350. Alternatively, arms 311-316 may all be curved relative to axis 350. In the closed configuration, arm assemblies 305-307 may extend across a distal end of lumen 340 of first body 301 and second body 302. In this instance, arm assemblies 305-307 may block a portion of a distal opening of lumen 340.

In operation, a user may move medical device 300 through a body lumen of a patient. In some examples, a user may first couple first body of 301 to a distal end of a bronchoscope, endoscope, colonoscope, duodenoscope, or other scope or insertion device and position control wires 309, 310 through a working channel of the insertion device. The user may insert medical device 300 into an opening (e.g., an incision in the body or a natural orifice) and may move medical device 300 through a body lumen to a target area with material to be removed from the body of the patient. In some examples, the user may move medical device 300 through the body of the patient in a neutral position, and in other examples the user may move arm assemblies 305-307 to an open configuration to expand the body lumen in which medical device 300 is positioned. Once medical device 300 is positioned at a target site where material is to be removed, the user may move arm assemblies 305-307 to a closed configuration to grasp material using arm assemblies 305-307 (e.g., as shown in FIG. 1C). Medical device 300 may then be moved proximally to remove the material grasped by medical device 300 through the body opening. Alternatively, medical device 300 may be moved distally within the lumen to deposit the material in another area of the body (e.g., moving material from the esophagus and into the stomach).

Figure 4A:
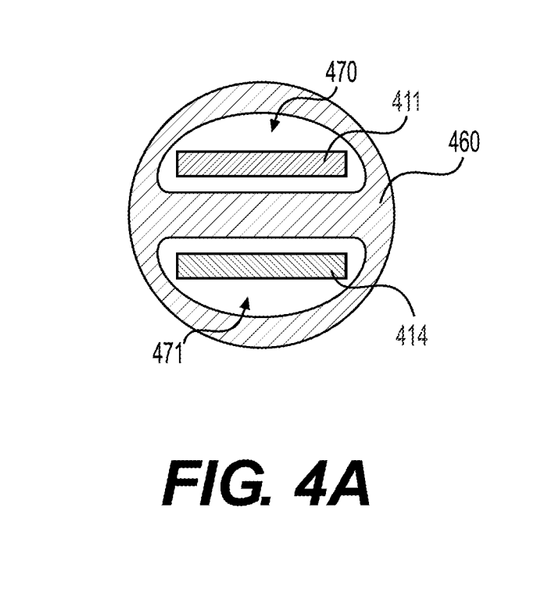
FIG. 4A is a front, cross-sectional view of a portion of an exemplary medical device, according to aspects of this disclosure.
Figure 4B:
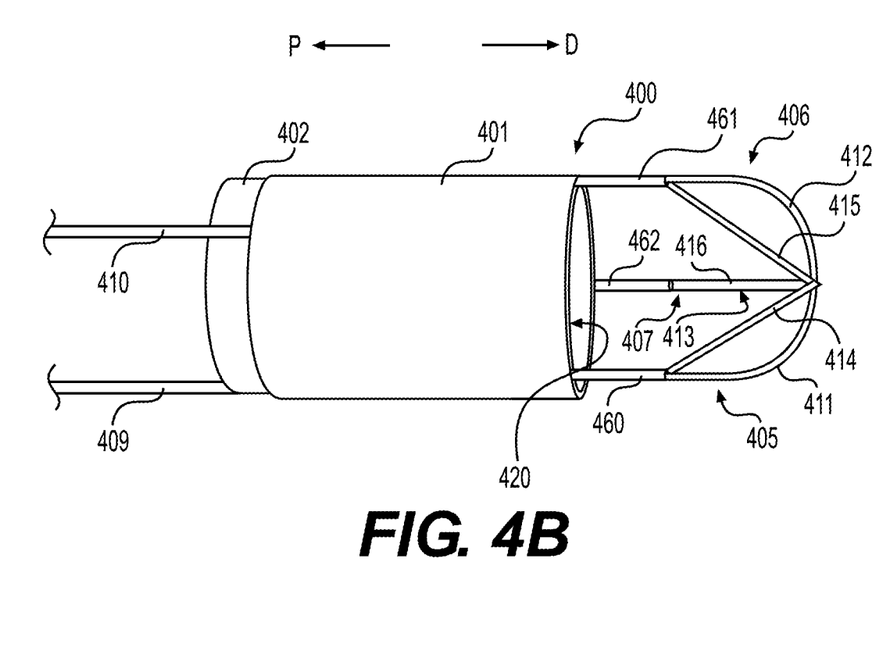
FIG. 4B is a side view of a distal portion of an exemplary medical device, according to aspects of this disclosure.

FIG. 4A illustrates a cross-sectional view of a support member 460 having arms 411, 414. FIG. 4B illustrates an alternative embodiment of a medical device 400 incorporating support members 460-462. Medical device 400 may include any of the features of medical device 300, and may operate in a similar manner as medical device 300. Medical device 400 may include arm assemblies 405-407 including arms 411-413 and arms 414-416, a first body 401, a second body 402 movable relative to first body 401, and control wires 409, 410. As shown in FIG. 4B, support members 460-462 may be positioned around a proximal portion of each arm assembly 405-407. Each of support members 460-462 may be cylindrical, may be a portion of the longitudinal length of each arm assembly 405-407, and may include two lumens extending longitudinal through the support member 460-462 (e.g. a first lumen 470 and a second lumen 471 of support member 460 shown in FIG. 4A). In some examples, each of support members 460-462 may be fixedly coupled to a distalmost end 420 of first body 401.

As described herein, FIG. 4A is a cross-section taken perpendicular to a central longitudinal axis of support member 460, and shows arm 412 positioned within lumen 470 and arm 415 positioned within lumen 471. Lumen 470 may be positioned on an opposite side of support member 460 as lumen 471, and each lumen 470, 471 may extend longitudinally through support member 460. For example, lumens 470, 471 may be diametrically opposed to each other about a central body of support member 460. In other examples, support member 460 may only include a single lumen that receives both arms 411, 414. Support members 461 and 462 may have any of the features of support member 460. Support members 460-462 may facilitate supporting each pair of arms (e.g. arms 411, 414; arms 412, 415; and arms 413, 416) together and may decrease the radius of curvature of each arm assembly 405-407 when medical device 400 is in a closed positioned (shown in FIG. 4B). It will be understood that medical device 400 may be operated in a similar manner as medical device 300 such that arms 411-416 may open and/or close in a manner similar to arms 311-316 of medical device 300.

Figure 5:
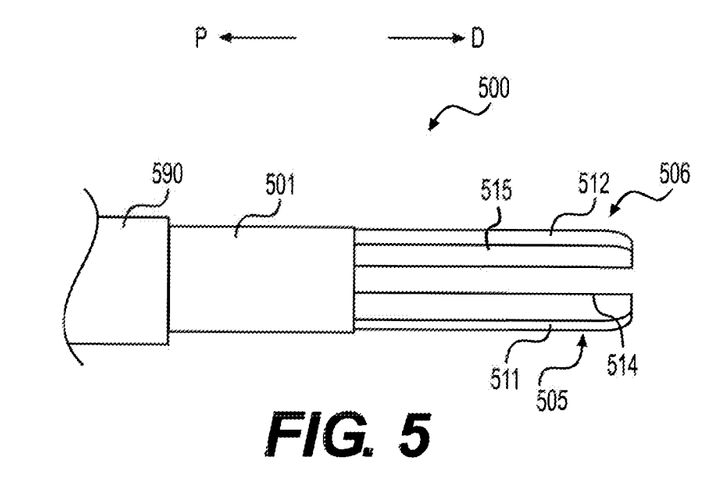
FIG. 5 is a side view of a distal portion of an exemplary medical device, according to aspects of this disclosure.

FIG. 5 illustrates an exemplary medical device 500 coupled to an endoscope 590. Medical device 500 may include arm assemblies 505, 506 and a first body 501. Arm assembly 505 may include arms 511, 514 and arm assembly 506 may include arms 512, 515. Medical device 500 may have any of the features of medical devices 100, 300, 400 and may operate in a similar manner as medical device 300. First body 501 may be coupled to a distal end of endoscope 590 (shown in FIG. 5), and a second body (not shown) may move proximally and distally through a lumen of first body 501 to actuate arm assemblies 505, 506. For example, the second body may move relative to first body 501 to actuate arm assemblies 505, 506 in a manner similar to the movement of first body 301 relative to second body 302 of medical device 300. In some examples, first body 501 may be fixedly coupled to endoscope 590 and in other examples first body 501 may be removably coupled to endoscope 590. Control wires may extend through a lumen of endoscope 590 to a proximal portion of endoscope 590, and a user may actuate control wires to move arm assemblies 505, 506 between a closed, neutral, or an open configuration, as described relative to medical device 300 in FIG. 3.

Figure 6:
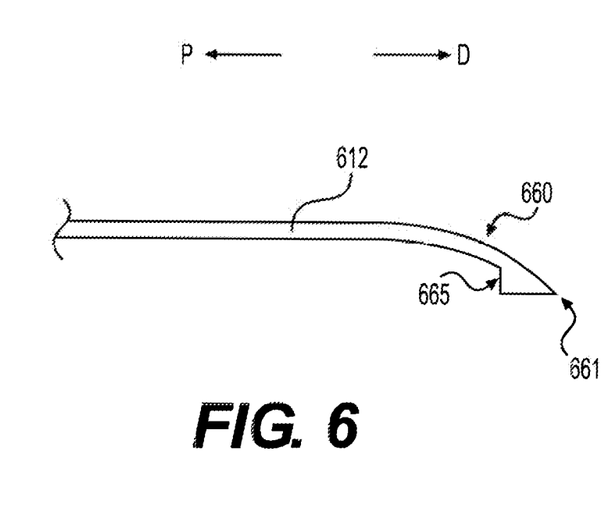
FIG. 6 is a side view of an exemplary arm for a medical device, according to aspects of this disclosure.

FIG. 6 shows an alternative embodiment of an arm 612 which may be incorporated into any of the medical devices, 100, 300, 400, 500 disclosed herein. Arm 612 includes a curved distal portion 660 and a pointed distalmost end 661. The curved distal portion 660 may be configured to be atraumatic when a device 100, 300, 400, 500 is moving within a patient's body. A ridge 665 of arm 612 may face a proximal direction when arm 612 is in a neutral position of arm 612. Ridge 665 may increase the surface area of arm 612 contacting the tissue and may be configured to aid in grasping and moving tissue. Arm 612 may be coupled to another arm at a position proximal from ridge 665. Curved distal portion 660, distalmost end 661, and ridge 665 may be incorporated into any of the medical devices 300, 400, 500, 700, 900 discussed in this application. For example, these features (e.g. curved distal portion 660, distalmost end 661, and ridge 665) may be incorporated at the distalmost ends of each of arm assemblies 305-307 of medical device 300. Since curved distal portion 660 is curved inward (oriented such that it curves inwards towards a central longitudinal axis of the medical device), distal portion 660 may slide across a surface of a body lumen and distalmost end 661 may not contact the surface of the body lumen because distal portion 660 is curved inward. For example, the radius of curvature of curved distal portion 660 may be small enough such that when arm 612 is in a fully-open position, distalmost end 661 does not contact a surface of a body lumen. Distalmost end 661 may facilitate moving arm 612 past a bolus or other material within a body lumen, and ridge 665 may facilitate moving a bolus or other material proximally as arm 612 is pulled proximally, allowing ridge 665 to contact the bolus or other material and "catch" or apply a force in the proximal direction to the bolus or other material.

Figure 7:
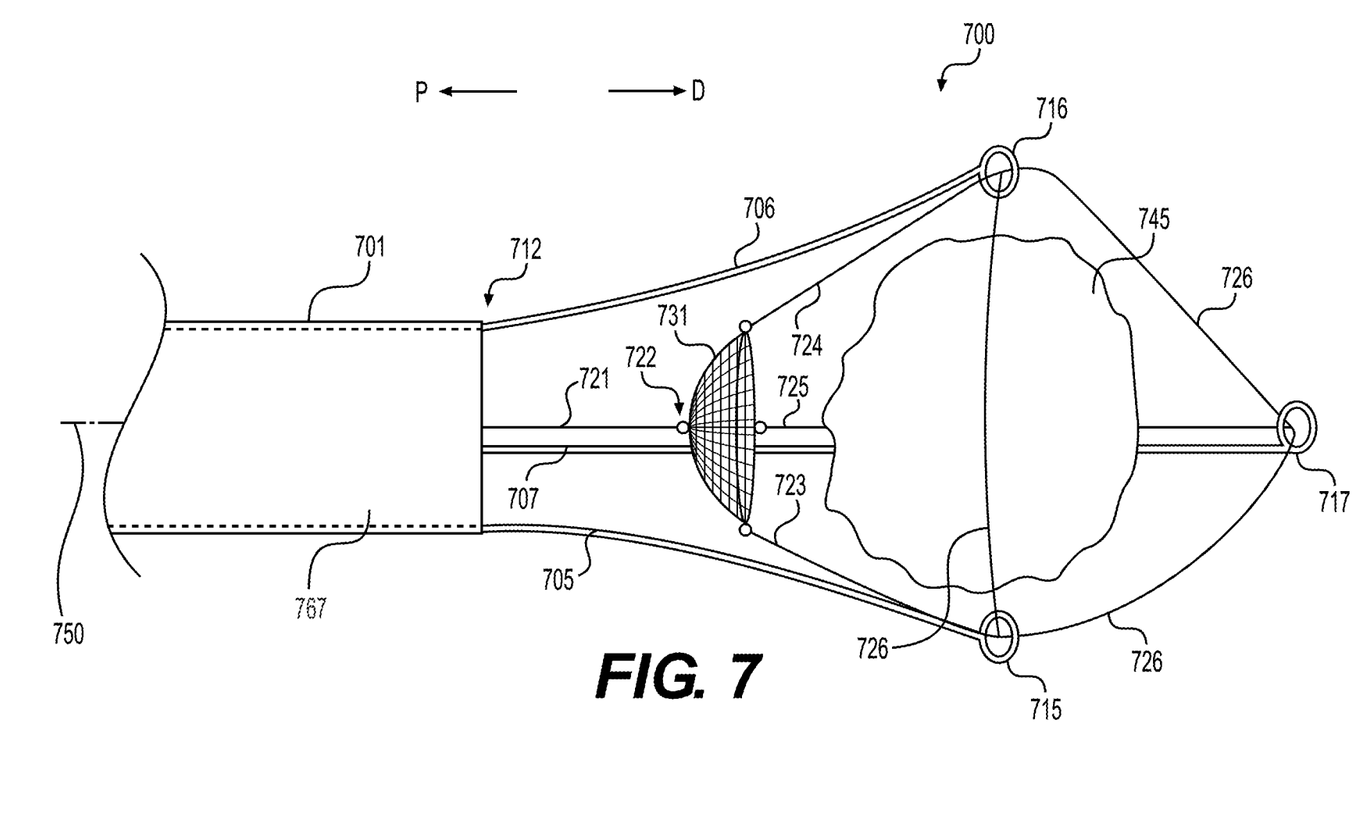
FIG. 7 is a side view of an exemplary medical device, according to aspects of this disclosure.

FIG. 7 shows a distal portion of a medical device 700. Medical device 700 may be used to grasp material 745 in a similar manner to medical devices 100, 300, 400, 500. Medical device 700 may include arms 705-707, a shaft 701 including a central lumen 767 extending longitudinally through shaft 701, a net 731, and one or more strings 721, 723-726 coupled to the net 731. It will be understood that the term "string" may include any cable, fiber, group of fibers, cord, or similar member. Each arm 705-707 may extend distally from a distalmost end 712 of shaft 701, and each arm 705-707 may be fixedly coupled to the distalmost end 712 of shaft 701. Each arm 705-707 may be coupled to shaft 701 at a radially-outer portion of shaft 701, relative to a central longitudinal axis 750 of shaft 701. Each arm 705-707 may by cylindrical and may include a ring portion 715-717 at a distalmost end of each corresponding arm 705-707. In other examples, each arm 705-707 may have a rectangular cross-section and/or may have any suitable shape. Ring portions 715-717 may be circular in shape, or may be any other suitable shape having a lumen extending therethrough. Although medical device 700 is shown with three arms 705-707, any other number of arms may be included in medical device 700 such as 2, 4, 5, 6, 7, or eight arms. Each of arms 705-707 may be biased to a position curved radially-outward from longitudinal axis 750.

String 726 may be circular in cross section, may be a closed-loop string, and may extend through each of rings 715-717 to form a circular shape at a distal end portion of medical device 700. String 726 may be sized to allow movement of string 726 through each ring portion 715-717 of each arm 705-707. A first string segment 723 may be coupled to string 726 proximate to first ring portion 715, a second string segment 724 may be coupled to string 726 proximate to second ring portion 716, and a third string segment 725 may be coupled to string 726 proximate to third ring portion 717. Each of string segments 723-725 may extend proximally from string 726 to net 731. String segments 723-725 may be coupled via their distal ends to an outer periphery of net 731 and may be coupled at positions on net 731 equidistant from each other. String segment 721 may be coupled to a central portion of net 731 via connection point 722 and may extend proximally through lumen 767 of shaft 701 to a proximal portion of medical device 700. Net 731 may have a triangular shape (shown in FIGS. 8A-8C), may be positioned closer to longitudinal axis 750 than each of arms 705-707, and may be configured to fit within lumen 767 of shaft 701. In some examples, net 731 may include a cross-sectional dimension greater than a dimension of a cross-section of lumen 767. It will be understood that net 731 may collapse or may be moved radially toward axis 750 during deployment such that net 731 may fit within lumen 767. FIG. 7 shows medical device 700 in an open configuration with material 745 positioned between arms 705-707.

Figure 8A:
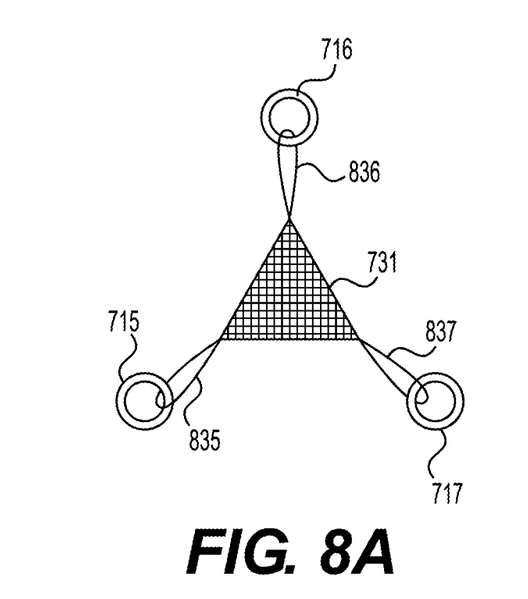
FIGS. 8A-8C are front views of different cable configurations for use with the medical device of FIG. 7, according to aspects of this disclosure.
Figure 8B:
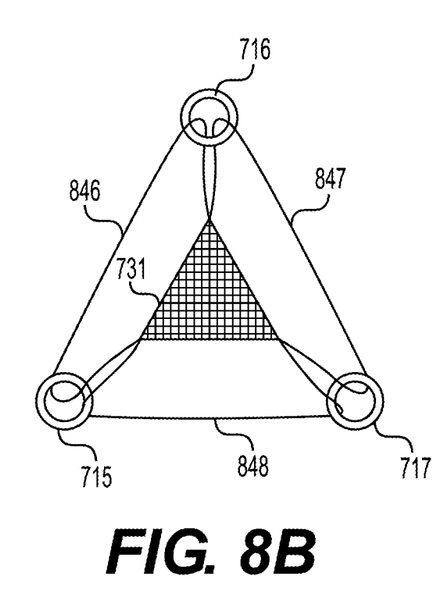
Figure 8C:
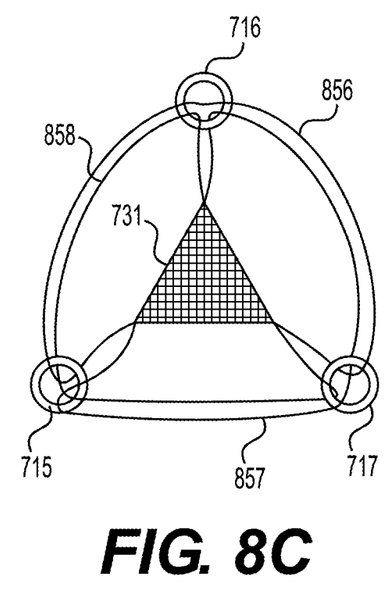

In operation, a user may position medical device 700 at a target site within a body lumen. The user may move device 700 distally to position material 745 between arms 705-707. As the user moves medical device 700 distally, net 731 may contact material 745 and may keep material 745 positioned between arms 705-707, which may facilitate gathering material 745 between arms 705-707 for grasping. In some examples, material 745 pushing against net 731 as device 700 moves distally may case arms 705-707 to passively close, without the user actuating string 721. For example, material 745 may push against net 731 as medical device 700 moves distally, which may cause each string segment 723-725 to move proximally and, thus, move portions of string 726 proximally. When portions of string 726 are moved proximally, ring portions 715-717 of arms 705-707 may be moved radially inward towards longitudinal axis 750 and towards each other, which will transition medical device 700 from an open position to a closed position. In other examples, a user may actively actuate string 721 by moving string 721 proximally in order to transition medical device 700 from an open position to a closed position. When a user moves string 721 proximally, each string segment 723-725 may be moved proximally and string 726 may be moved proximally, drawing arms 705-707 together. Once medical device 700 is in a closed position with material 745 between arms 705-707 and/or trapped within net 731, the user may remove device 700 from the body of the patient. In other examples, the user may move device 700 distally to move material 745 to a different area of the patient's body, such as the patient's stomach FIGS. 8A-8C illustrate front views of alternative string configurations for medical device 700 shown in FIG. 7. Specifically, only the relevant strings, net 731, and ring portions 715-717 are shown in FIGS. 8A-8C purely for illustration purposes. Each of the string assemblies shown in FIG. 8A-8C may include string 721 extending proximally from net 731. In FIG. 8A, a first string segment 835 is coupled to a first corner of net 731 and extends through loop portion 715 and back to the first corner of net 731. A second string segment 836 is coupled to a second corner of net 731 and extends through loop portion 716 and back to the second corner of net 731. A third string segment 837 is coupled to a third corner of net 731 and extends through loop portion 717 and back to the third corner of net 731. FIG. 8B illustrates a string configuration including a first string segment 846 coupled to a first corner of net 731, extending through loop portion 715 and loop portion 716 and to a second corner of net 731. A second string segment 847 is coupled to the second corner of net 731, extends through loop portion 716 and loop portion 717 and is also coupled to a third corner of net 731. A third string segment 848 is coupled to the third corner of net 731, extends through loop portion 717 and loop portion 715 and is also coupled to the first corner of net 731.

FIG. 8C shows another string configuration for medical device 700 including a first string segment 856 coupled to a first corner of net 731, extending through ring portion 715, ring portion 716, and ring portion 717 and coupled to a second corner of net 731. A second string segment 857 is coupled to a third corner of net 731, extends through ring portion 716, ring portion 717, and ring portion 715, and is coupled to the first corner of net 731. A third string segment 858 is coupled to the second corner of net 731, extends through ring portion 717, ring portion 715, and ring portion 716, and is coupled to the third corner of net 731. Each of the string configurations shown in FIGS. 8A-8C may operate in the manner described hereinabove regarding medical device 700. Although net 731 is shown in a triangular shape, net 731 is not so limited and may be rectangular, square, circular, oval, or any other suitable shape.

Figure 9A:
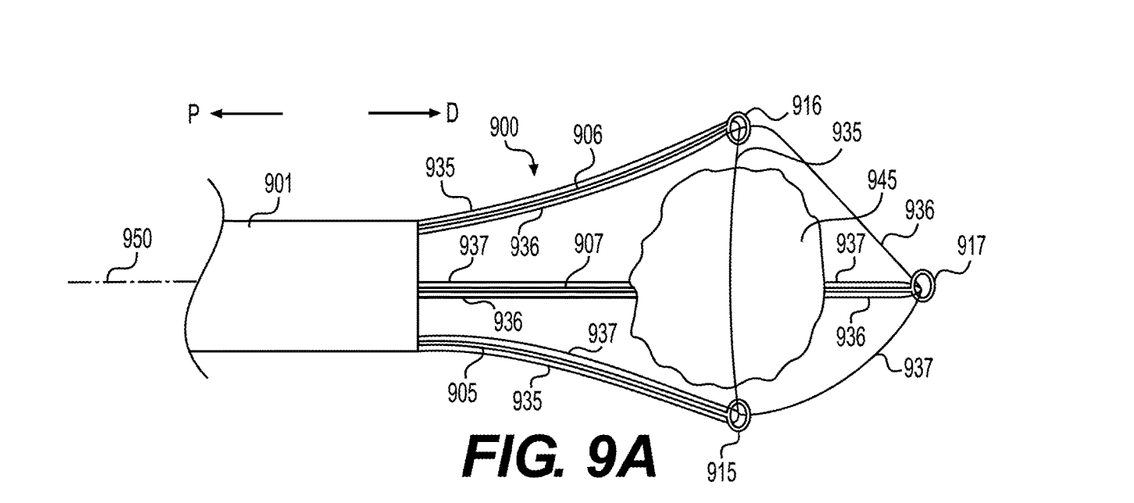
FIGS. 9A and 9B are side views of an exemplary medical device, according to aspects of this disclosure.
Figure 9B:
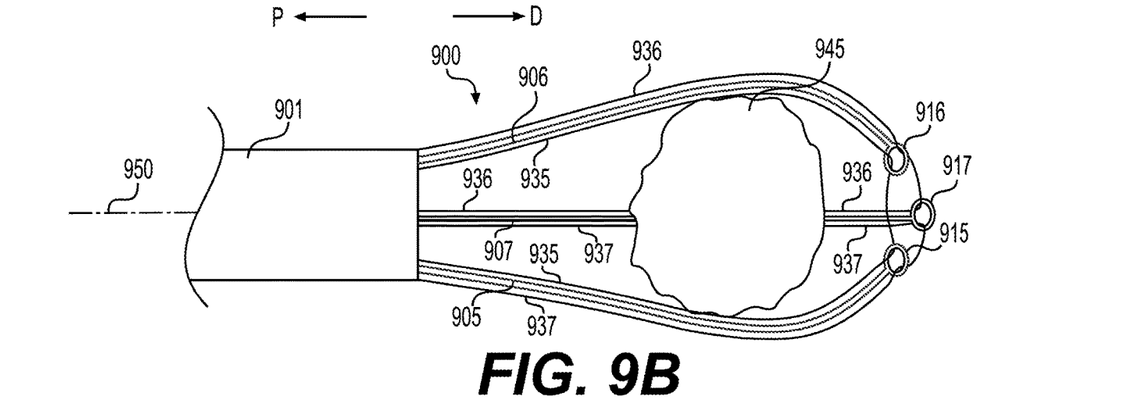

FIGS. 9A and 9B show side views of a distal portion of another embodiment of medical device 900. Medical device 900 may include a shaft 901, arms 905-907 including distal ring portions 915-917, and string segments 935-937. Medical device 900 may have any of the features of medical device 700, and may operate in a similar manner to medical device 700. Each of arms 905-907 may be fixedly coupled to shaft 901 at a distal portion of shaft 901, and each arm 905-907 may extend distally from shaft 901. Each arm 905-907 may be biased towards a position in which each arm 905-907 extends away from a central longitudinal axis 950 of device 900. Although shown with three arms 905-907, medical device 900 may have any number of arms such as 2, 4, 5, 6, 7, 8, etc.

Figure 9C:
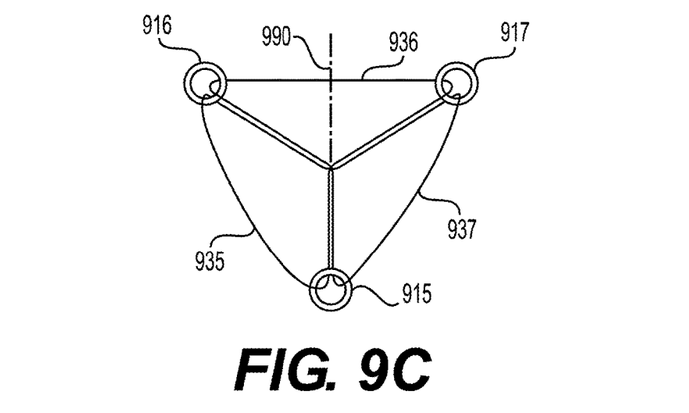
FIG. 9C is a front view of the medical device of FIGS. 9A and 9B, according to aspects of this disclosure

In some examples, medical device 900 may include three separate string segments 935-937 movably coupled to arms 905-907. Each of string segments 935-937 may be coupled together at their proximal ends at a position within a lumen (not shown) of shaft 901, and may be coupled to a single string segment (shown as string 990 in FIG. 9C) that extends proximally through the lumen of shaft 901 to a proximal end of shaft 901. FIG. 9C illustrates a front view of device 900 with shaft 901 and the proximal portion of arms 905-907 removed for clarity to view string segments 935-937. First string segment 935 may extend adjacent to arm 905 from a proximal position within shaft 901, through ring portion 915 and ring portion 916, and back proximally and adjacent to arm 906 to a proximal position within the lumen of shaft 901. Second string segment 936 may extend adjacent to arm 906 from a proximal position within the lumen of shaft 901, through ring portion 916 and ring portion 917, and back proximally and adjacent to arm 907 to a proximal position within the lumen of shaft 901. Third string segment 937 may extend adjacent to arm 907 from a proximal position within the lumen of shaft 901, through ring portion 917 and ring portion 915, and back proximally and adjacent to arm 905 to a proximal position within the lumen of shaft 901. Although FIGS. 9A and 9B show each of string segments 935-937 extending within the lumen of shaft 901. In other examples, each of string segments 935-937 may be coupled together at a position distal of a distalmost end of shaft 901. Medical device 900 may be configured to transition from an open configuration (shown in FIG. 9A) to a closed configuration (shown in FIG. 9B) when a user pulls string segment 990 proximally.

In operation, a user may position medical device 900 at a target area within a patient's body lumen, and then may move medical device 900 distally while arms 905-907 are in an open configuration. The user may position material 945, such as a bolus, between arms 905-907. In some examples, the user may adjust the position of arms 905-907 and reduce the distance between arms 905-907 and central longitudinal axis 950 by pulling string segment 990 proximally. Once material 945 is positioned between arms 905-907, the user may then pull string segment 990 proximally, which may move string segments 935-937 proximally and pull arms 905-907 radially inward towards axis 950. By transitioning medical device 900 from an open configuration to a closed configuration, arms 905-907 may be moved towards material 945 to grasp material 945. Since each of string segments 935-937 move loop portions 915-917 towards each other, arms 905-907 may bend and/or curve around material 945 when in a closed configuration, as shown in FIG. 9B. Once the material 945 is grasped and/or held by device 900, the user may move device 900 proximally to remove material the patient's body. In other examples, the user may move device 900 distally to move material 945 to a different area of the patients body, such as the patient's stomach.

Each of the aforementioned devices and systems may be used to grasp, manipulate, and/or otherwise move bodily material and/or dilate a body lumen. Any of the aforementioned devices may be used with an insertion device, such as an endoscope or duodenoscope. In any of the aforementioned methods, a user may view the one or more medical devices using endoscopic imaging techniques and may be used to clear a bolus or other material from an esophagus or other body lumen of a patient.

It will be apparent to those skilled in the art that various modifications and variations may be made in the disclosed devices and methods without departing from the scope of the disclosure. Other aspects of the disclosure will be apparent to those skilled in the art from consideration of the specification and practice of the features disclosed herein. It is intended that the specification and examples be considered as exemplary only.

We claim:

1. A medical device comprising:
a first body having a lumen and a central longitudinal axis;
a second body positioned at least partially within the lumen of the first body; and
an arm assembly including:
a first arm coupled to the first body and extending distal to the first body; and
a second arm coupled to the second body and extending distal to the second body, wherein a distal end of the first arm is coupled to a distal end of the second arm;
wherein the first arm includes a first protrusion on a surface of the first arm, and the second arm includes a second protrusion on a surface of the second arm, and wherein the first protrusion and the second protrusion extend radially-inward towards the central longitudinal axis;

wherein distal movement of the second body, relative to the first body, is configured to move the distal end of the first arm and the distal end of the second arm radially-outward away from the central longitudinal axis;

wherein proximal movement of the second body, relative to the first body, is configured to move the distal end of the first arm and the distal end of the second arm radially-inward towards the central longitudinal axis; and wherein the first and second protrusions are configured to move proximally and distally relative to each other in response to movement of the second body relative to the first body, wherein a proximal end of the first arm and a proximal end of the second arm are positioned adjacent to each other when the medical device is in a neutral configuration, and wherein the first protrusion is positioned on the proximal end of the first arm, and wherein the second protrusion is positioned on the proximal end of the second arm.

2. The medical device of claim 1, further comprising a first control wire extending proximally from the first body and a second control wire extending proximally from the second body.

3. The medical device of claim 1, wherein the arm assembly is a first arm assembly, and further comprising:
a second arm assembly including:
a third arm coupled to a distal portion of the first body and extending distal to the first body; and
a fourth arm coupled to a distal portion of the second body and extending distal to the second body, wherein a distal end portion of the third arm is coupled to a distal end portion of the fourth arm; and
a third arm assembly including:
a fifth arm coupled to a distal portion of the first body and extending distal to the first body;
a sixth arm coupled to a distal portion of the second body and extending distal to the second body, wherein a distal end portion of the fifth arm is coupled to a distal end portion of the sixth arm;
wherein distal movement of the second body, relative to the first body, is configured to move the distal end portion of the third arm, the distal end portion of the fourth arm, the distal end portion of the fifth arm, and the distal end portion of the sixth arm radially-outward away from the central longitudinal axis; and
wherein proximal movement of the second body, relative to the first body, is configured to move the distal end portion of the third arm, the distal end portion of the fourth arm, the distal end portion of the fifth arm, and the distal end portion of the sixth arm move radially-inward towards the central longitudinal axis.

4. The medical device of claim 3, wherein the first arm assembly, the second arm assembly, and the third arm assembly are evenly spaced from each about the central longitudinal axis.

5. The medical device of claim 1, wherein the first body is cylindrical and includes a first lumen; and wherein the second body is cylindrical, includes a second lumen, and is positioned within the first lumen, wherein the first arm and the second arm are connected together at a distalmost end of the arm assembly.

6. The medical device of claim 1, wherein the first protrusion defines a surface facing a proximal direction when the second arm is parallel to the central longitudinal axis.

7. The medical device of claim 1, wherein the first arm contacts the second arm at a position between the proximal end and a distal end of the first arm when the first arm and the second arm are generally parallel to the central longitudinal axis and the medical device is in the neutral configuration; and wherein the first arm is spaced from the second arm at a position between the proximal end and the distal end of the first arm when the medical device is moved to an open configuration or a closed configuration such that at least one of the first arm or the second arm is angled relative to the central longitudinal axis.

8. The medical device of claim 1, wherein:
the first arm is curved towards the central longitudinal axis when the medical device is in a closed configuration;
the second arm is curved away from the central longitudinal axis when the medical device is in an open configuration;
the proximal end of the first arm is distal to the proximal end of the second arm when the medical device is in an open configuration; and
the proximal end of the second arm is distal to the proximal end of the first arm when the medical device is in a closed configuration.

9. The medical device of claim 1, wherein distal movement of the second protrusion of the second arm, while the first protrusion of the first arm remains stationary, transitions the arm assembly to the neutral configuration.

10. The medical device of claim 1, wherein the distal end of the first arm and the distal end of the second arm form a terminal distalmost end of the arm assembly.

11. A medical device comprising:
a first body having a lumen and a central longitudinal axis;
a second body positioned at least partially within the lumen of the first body;
wherein the first body is cylindrical and includes a first lumen; wherein the second body is cylindrical, includes a second lumen, and is positioned within the first lumen; and
an arm assembly including:
a first arm coupled to the first body and extending distal to the first body; and
a second arm coupled to the second body and extending distal to the second body, wherein a distalmost end of the first arm is coupled to a distalmost end of the second arm, wherein the distalmost end of the first arm and the second arm form the distalmost end of the arm assembly;
wherein the first arm is curved towards the central longitudinal axis when the medical device is in a closed configuration;
wherein the second arm is curved away from the central longitudinal axis when the medical device is in an open configuration;
wherein distal movement of the second body, relative to the first body, is configured to move the distalmost end of the first arm and the distalmost end of the second arm radially-outward away from the central longitudinal axis; and
wherein proximal movement of the second body, relative to the first body, is configured to move the distalmost end of the first arm and the distalmost end of the second arm radially-inward towards the central longitudinal axis, wherein relative movement of the first body and the second body results in a proximal end of the first arm being distal to a proximal end of the second arm when the medical device is in an open configuration and the proximal end of the second arm being distal to the proximal end of the first arm when the medical device is in a closed configuration.

12. The medical device of claim 11, wherein the proximal end of the first arm is coupled to a distal end of the first body, and wherein the proximal end of the second arm is coupled to a distal end of the second body.

13. The medical device of claim 11, further comprising a first control wire coupled to and extending proximally from the first body and a second control wire coupled to and extending proximally from the second body.

14. A medical device comprising:
a first body having a first lumen and a central longitudinal axis;
a second body having a second lumen positioned at least partially within the first lumen of the first body; and
an arm assembly including:
  a first arm coupled to the first body and extending distal to the first body; and
  a second arm coupled to the second body and extending distal to the second body, wherein a distalmost end of the first arm is coupled to a distalmost end of the second arm, wherein the first arm and the second arm are directly connected together at a terminal distalmost end of the arm assembly, wherein the second arm is at least partially positioned within the second lumen;
wherein the first body and the second body are concentric cylindrical bodies configured to move relative to one another along the central longitudinal axis to cause radial movement of the first arm and the second arm;
wherein distal movement of the second body, relative to the first body, is configured to move the distalmost end of the first arm and the distalmost end of the second arm radially-outward away from the central longitudinal axis; and
wherein proximal movement of the second body, relative to the first body, is configured to move the distalmost end of the first arm and the distalmost end of the second arm radially-inward towards the central longitudinal axis.

15. The medical device of claim 14, further comprising a first control wire coupled to and extending proximally from the first body and a second control wire coupled to and extending proximally from the second body.

* * * * *